(12) United States Patent
Gu

(10) Patent No.: US 8,385,737 B2
(45) Date of Patent: Feb. 26, 2013

(54) STEREOPICTURE SHOOTING BRACKET

(76) Inventor: Jinchang Gu, Shanghai (CN)

(*) Notice: Subject to any disclaimer, the term of this patent is extended or adjusted under 35 U.S.C. 154(b) by 69 days.

(21) Appl. No.: 13/140,023

(22) Filed: Jun. 16, 2011

(65) Prior Publication Data

US 2011/0255853 A1 Oct. 20, 2011

(51) Int. Cl.
*G03B 35/00* (2006.01)
(52) U.S. Cl. ............................ 396/329; 396/428
(58) Field of Classification Search ............ 396/5, 329, 396/419, 420, 324, 428
See application file for complete search history.

(56) References Cited

U.S. PATENT DOCUMENTS

| | | | | |
|---|---|---|---|---|
| 3,598,355 A | * | 8/1971 | English | 396/428 |
| 3,727,532 A | * | 4/1973 | Gregory | 348/121 |
| 4,214,821 A | * | 7/1980 | Termes | 352/70 |
| 4,699,484 A | * | 10/1987 | Howell et al. | 352/243 |
| 4,768,049 A | * | 8/1988 | Barrett et al. | 396/329 |
| 6,360,673 B1 | * | 3/2002 | Herrin et al. | 105/141 |
| 7,520,684 B2 | * | 4/2009 | Ingalls et al. | 396/419 |
| 2005/0231689 A1 | * | 10/2005 | Longley | 352/243 |
| 2006/0072007 A1 | * | 4/2006 | Gilor | 348/61 |
| 2007/0095246 A1 | * | 5/2007 | Heiligenmann | 104/307 |
| 2008/0315543 A1 | * | 12/2008 | Fisher | 280/86 |
| 2009/0212194 A1 | * | 8/2009 | Wood | 248/647 |
| 2009/0315288 A1 | * | 12/2009 | Hernandez | 280/79.3 |
| 2010/0008661 A1 | * | 1/2010 | Wood | 396/428 |

* cited by examiner

*Primary Examiner* — Clayton E Laballe
*Assistant Examiner* — Warren K Fenwick

(57) ABSTRACT

A stereopicture shooting bracket, includes: a bracket (10), a base (9) mounted on the base (10), a curved rail mounted on the base (9), a sliding block (2) moving along the curved rail (1), a camera (3) capable of continuous shooting mounted on a top of the sliding block (2), and a driving device for driving the sliding block (2). A circle the curved rail (1) locating locates on a horizontal plane. The stereopicture shooting bracket according to the present invention is capable of shooting pictures of a same object continuously from different angles, so as to overcome the drawback that the focus, metering, and angle of different cameras can not be consistent at the shooting moment.

20 Claims, 1 Drawing Sheet

STEREOPICTURE SHOOTING BRACKET

BACKGROUND OF THE PRESENT INVENTION

1. Field of Invention

The present invention relates to a stereopicture shooting bracket.

2. Description of Related Arts

The conventional stereocameras on sale are assembled by several ordinary cameras or single lens reflex cameras. Due to the fact that the focus, metering, and angle of different cameras can not be consistent at the shooting moment, they have not become commercialization and marketization. On the other hand, the assembled cameras have high cost and complicated operation, as well as the poor effect of stereopictures shot by the stereopicture camera composed of several cameras due to the above reasons. Therefore, the market of stereopicture cameras have not been spread or popularized.

SUMMARY OF THE PRESENT INVENTION

Technical Problem

A technical problem to be solved by the present invention is to overcome the drawback in the prior art that a device for shooting pictures of the same scene continuously from different angles is lacked, and provide a stereopicture shooting bracket for shooting pictures of the same object continuously from different angles.

Technical Proposal

In order to solve the technical problem, the present invention provides:

A stereopicture shooting bracket, comprising a bracket, which is characterized in that:

the stereopicture shooting bracket further comprises a base mounted on the bracket, a curved rail mounted on the base, wherein a circle of the curved rail is positioned in a horizontal plane, a slider is provided on the curved rail and moves along the curved rail for mounting a camera capable of continuous shooting on a top of the slider, and a driving device for driving the slider to move.

Preferably, the driving device comprises a driving wheel mounted on a first end of the base and driven by an electromotor, and a driven wheel mounted on a second end of the base and corresponding to the driving wheel, wherein the driving wheel and the driven wheel are on a same side of the curved rail, and are connected to each other via a transmission element, the slider are fixedly connected with the transmission element on an adjacent part thereof.

Preferably, the transmission element is a transmission belt or a transmission chain.

Preferably, a limit switch is mounted on each side of the rail.

Preferably, a shutter of the camera and the electromotor of the driving device are controlled by a linkage switch.

Beneficial Effect

The positive beneficial effect of the present invention is as follows. The stereopicture shooting bracket according to the present invention is capable of shooting pictures of a same object continuously from different angles, so as to overcome the drawback that the focus, metering, and angle of different cameras can not be consistent at the shooting moment. Additionally, the present invention has advantages of simple structure, convenient operation, good shooting effect and low cost.

DETAILED DESCRIPTION OF THE PREFERRED EMBODIMENT

Figure 1:
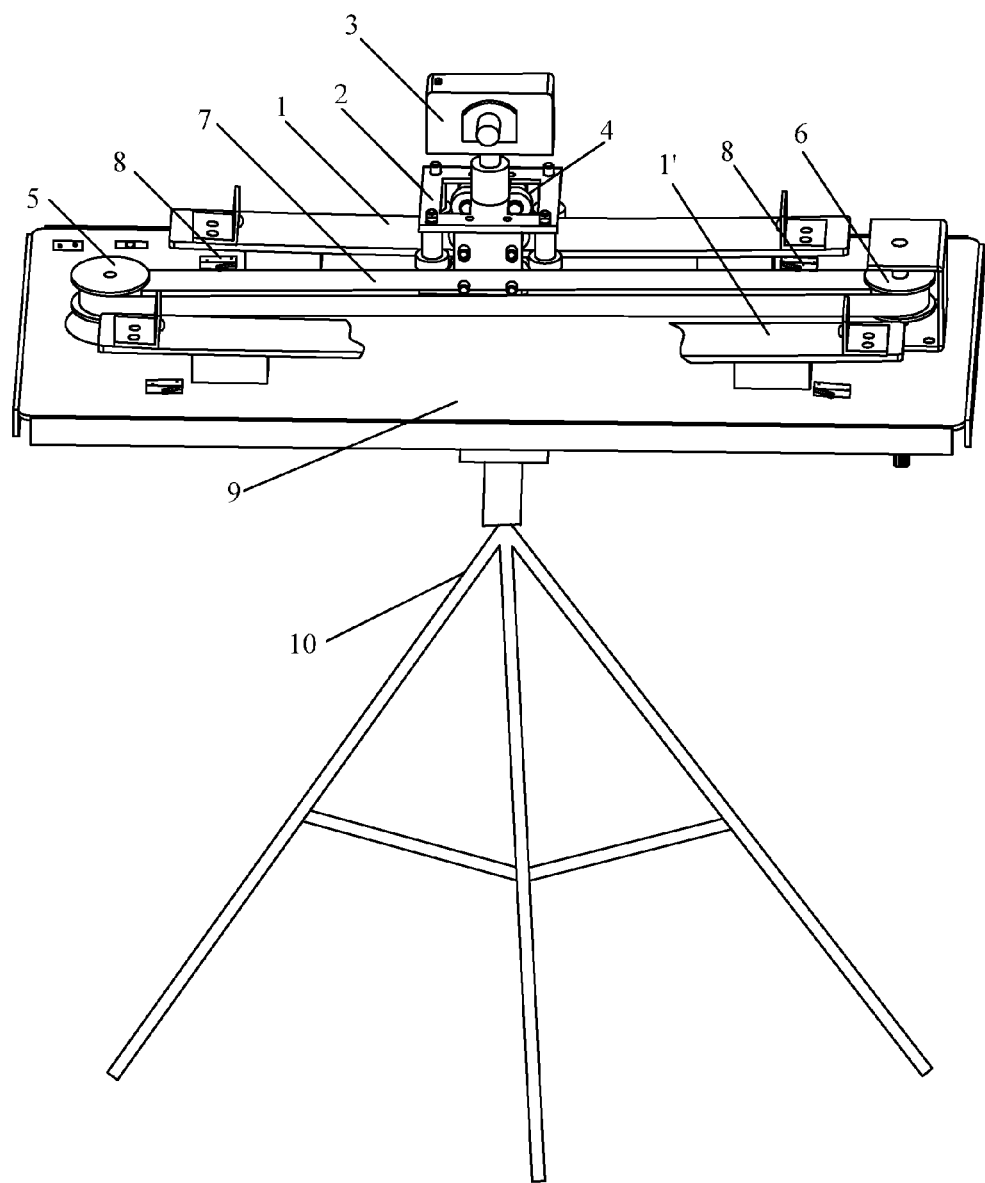
FIG. 1 is a perspective view of a stereopicture shooting bracket according to a preferred embodiment of the present invention.

A preferred embodiment of the present invention is described by accompanied with the drawing.

Figure 2:
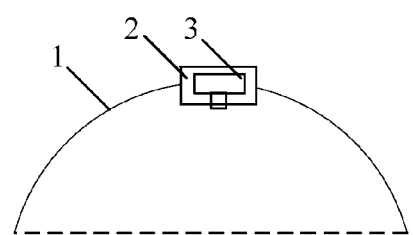
FIG. 2 is a planform sketch view of the stereopicture shooting bracket according to the preferred embodiment of the present invention when shooting.

Referring to FIG. 1 of the drawings, a stereopicture shooting bracket according to the present invention comprises a base 9 and a bracket 10 for supporting the base 9. A curved rail 1 is mounted above the base 9. A chord (broken lines in FIG. 2) of the curved rail 1 confronts an object (not shown in the drawings) to be shot. A slider 2 is mounted on the curved rail 1 and is capable of moving along the curved rail 1. A camera 3 for shooting is mounted on a top of the slider 2. The camera 3 and the slider 2 can be fixed by inserting connection, blocking connection or screwing connection. Four guiding wheels 4 adapted to the curved rail 1 are pivotally mounted on the slider 2 for the slider 2 to move on the curved rail 1 more smoothly. The four guiding wheels 4 can be positioned on a same side surface of the curved rail 1, or positioned on an upper surface and a lower surface of the curved rail 1 by separated into two groups.

The stereopicture shooting bracket further comprises a driving device for driving the slider 2. The driving device comprises a driving wheel 5 and a driven wheel 6 pivotally mounted on two ends of the base 9 respectively. The driving wheel 5 and the driven wheel 6 are on a same side of the curved rail 1, and rotating axises thereof are in a vertical surface. The driving wheel 5 and the driven wheel 6 are connected via a transmission belt 7. An electromotor (not shown in the drawings) for driving the driving wheel 5 is mounted on the base 9. The slider 2 is fixedly connected with an adjacent part of the transmission belt 7, so as to drive the slider 2 to move along the curved rail 1 when the transmission belt 7 works. Preferably, the transmission belt 7 can be connected with the slider 2 via adhering connection or mechanical connection such as screw. Additionally, a chain can be adopted to replace the transmission belt. The present invention does not further limit the manners, any mechanism to accomplish driving a slider to move in the prior art can be utilized in the present invention.

Preferably, to prevent the slider 2 from sliding out of the curved rail 1 when sliding, a limit switch 8 is mounted on each end of the curved rail 1. The limit switches 8 are in linkage controlling with the electromotor for controlling the driving wheel 5. When the slider 2 moves to the limit switch 8 and actuates the limit switch 8, the electromotor stops rotating.

The camera has function of continuous shooting for 2-16 pictures per second. The shooting time of the camera is 1-8 seconds which can be adjust for still objects. A shutter release of the camera is extended to a same two wire switch of the electromotor to share the two wire switch with the electromotor, in such a manner that when the electromotor rotates, the camera begins to shoot, when the switch of the electromotor is shut down, the camera stops shooting at the same time, so as to produce automatic controlling.

Additionally, a radian and an arc length of an arc of the curved rail 1 can be adjusted according to particular shooting circumstances, and several curved rails of different length and radian can be mounted on the base 9 according to a distance from a scene to be shot. As shown in FIG. 1, two curved rails 1, 1' of different length and radian are mounted on two ends of the transmission belt 7, and a slider is provided on each of the curved rails 1, 1' for mounting a shooting device. The sliders on each of the curved rails 1, 1' are fixedly connected with adjacent parts of the transmission belt 7 respectively. The details of the curved rail 1' is omitted which can refer to the curved rail 1.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A stereopicture shooting bracket, comprising:
a bracket;
a base mounted on said bracket;
a curved rail mounted on said base, wherein a circle of said curved rail is positioned in a horizontal plane;
a slider provided on said curved rail and capable of moving along said curved rail for mounting a camera capable of continuous shooting on a top of said slider; and
a driving device for driving said slider to move.

2. The stereopicture shooting bracket, as recited in claim 1, wherein said driving device comprises: a driving wheel mounted on a first end of said base for being driven by an electromotor, a driven wheel mounted on a second end of said base and corresponding to said driving wheel, and a transmission element, wherein said driving wheel and said driven wheel are on a same side of said curved rail, and are connected to each other via said transmission element, said slider are fixedly connected with said transmission element on an adjacent part thereof.

3. The stereopicture shooting bracket, as recited in claim 2, wherein said transmission element is a transmission belt or a transmission chain.

4. The stereopicture shooting bracket, as recited in claim 3, wherein a limit switch is mounted on each side of said rail.

5. The stereopicture shooting bracket, as recited in claim 4, wherein a shutter of said camera and said electromotor of said driving device are controlled by a linkage switch.

6. The stereopicture shooting bracket, as recited in claim 5, wherein four guiding wheels adapted to said curved rail are pivotally mounted on said slider for said slider to move on said curved rail more smoothly.

7. The stereopicture shooting bracket, as recited in claim 4, wherein said limit switches are in linkage controlling with said electromotor for controlling said driving wheel, when said slider moves to said limit switch and actuates said limit switch, said electromotor stops rotating.

8. The stereopicture shooting bracket, as recited in claim 2, wherein a limit switch is mounted on each side of said rail.

9. The stereopicture shooting bracket, as recited in claim 2, wherein a shutter of said camera and said electromotor of said driving device are controlled by a linkage switch.

10. The stereopicture shooting bracket, as recited in claim 8, wherein said limit switches are in linkage controlling with said electromotor for controlling said driving wheel, when said slider moves to said limit switch and actuates said limit switch, said electromotor stops rotating.

11. The stereopicture shooting bracket, as recited in claim 2, wherein four guiding wheels adapted to said curved rail are pivotally mounted on said slider for said slider to move on said curved rail more smoothly.

12. The stereopicture shooting bracket, as recited in claim 2, wherein said stereopicture shooting bracket comprises two curved rails of different length and mounted on two ends of said transmission element, and two sliders provided on said curved rails for mounting a shooting device respectively, wherein said sliders on each of said curved rails are fixedly connected with adjacent parts of said transmission element respectively.

13. The stereopicture shooting bracket, as recited in claim 1, wherein a limit switch is mounted on each side of said rail.

14. The stereopicture shooting bracket, as recited in claim 13, wherein said limit switches are in linkage controlling with said electromotor for controlling said driving wheel, when said slider moves to said limit switch and actuates said limit switch, said electromotor stops rotating.

15. The stereopicture shooting bracket, as recited in claim 13, wherein said stereopicture shooting bracket comprises two curved rails of different length and mounted on two ends of said transmission element, and two sliders provided on said curved rails for mounting a shooting device respectively, wherein said sliders on each of said curved rails are fixedly connected with adjacent parts of said transmission element respectively.

16. The stereopicture shooting bracket, as recited in claim 1, wherein a shutter of said camera and an electromotor of said driving device are controlled by a linkage switch.

17. The stereopicture shooting bracket, as recited in claim 1, wherein four guiding wheels adapted to said curved rail are pivotally mounted on said slider for said slider to move on said curved rail more smoothly.

18. The stereopicture shooting bracket, as recited in claim 17, wherein said four guiding wheels are positioned on a same side surface of said curved rail.

19. The stereopicture shooting bracket, as recited in claim 17, wherein said four guiding wheels are positioned on an upper surface and a lower surface of said curved rail by separated into two groups.

20. The stereopicture shooting bracket, as recited in claim 1, wherein said stereopicture shooting bracket comprises two curved rails of different length and mounted on two ends of said transmission element, and two sliders provided on said curved rails for mounting a shooting device respectively, wherein said sliders on each of said curved rails are fixedly connected with adjacent parts of said transmission element respectively.

* * * * *